US012683756B2

(12) United States Patent
Lu et al.

(10) Patent No.: US 12,683,756 B2
(45) Date of Patent: Jul. 14, 2026

(54) FALLING-EDGE MODULATION SIGNAL RECEIVER AND FALLING-EDGE MODULATION SIGNAL SAMPLING METHOD

(71) Applicant: REALTEK SEMICONDUCTOR CORPORATION, Hsinchu (TW)

(72) Inventors: Chien-Hsun Lu, Hsinchu (TW); Chu-King Kung, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 187 days.

(21) Appl. No.: 18/600,873

(22) Filed: Mar. 11, 2024

(65) Prior Publication Data

US 2024/0313940 A1     Sep. 19, 2024

(30) Foreign Application Priority Data

Mar. 17, 2023     (TW) ................................. 112110014

(51) Int. Cl.
*H03D 3/18* (2006.01)
*G06F 3/16* (2006.01)
*H03D 3/24* (2006.01)
*H04L 7/00* (2006.01)
*H04L 7/033* (2006.01)

(52) U.S. Cl.
CPC ............ *H04L 7/0079* (2013.01); *G06F 3/162* (2013.01); *H04L 7/033* (2013.01)

(58) Field of Classification Search
CPC ..... H04L 7/0079; H04L 7/033; H04L 7/0331; G06F 3/162
USPC ................................. 375/238, 324, 325, 327
See application file for complete search history.

(56) References Cited

U.S. PATENT DOCUMENTS

2014/0002153 A1*   1/2014   Yang ..................... H04L 7/0331
                                                                327/158

* cited by examiner

*Primary Examiner* — Phuong Phu
(74) *Attorney, Agent, or Firm* — WPAT, PC

(57) ABSTRACT

A falling-edge modulation signal receiver is configured to process an input signal having a duty cycle varying with a bit value of the input signal. The receiver includes: a phase-locked loop for generating an oversampling clock according to the input signal which correlates with a signal clock, wherein the oversampling frequency is not lower than five times the frequency of the signal clock; an oversampling circuit for sampling the input signal according to the over-sampling clock and thereby generating multiple groups of data which as a whole is corresponding to a single bit of the input signal; and a decision circuit for ascertaining that X bits of the multiple groups of data are 1 and determining the value of the single bit according to the X. When the X is greater/less than a threshold, the decision circuit determines that the value of the single bit is 1/0.

10 Claims, 7 Drawing Sheets

200 falling-edge modulation signal (bit "1")

falling-edge modulation signal (bit "0")

T0         TS         T1

200

230

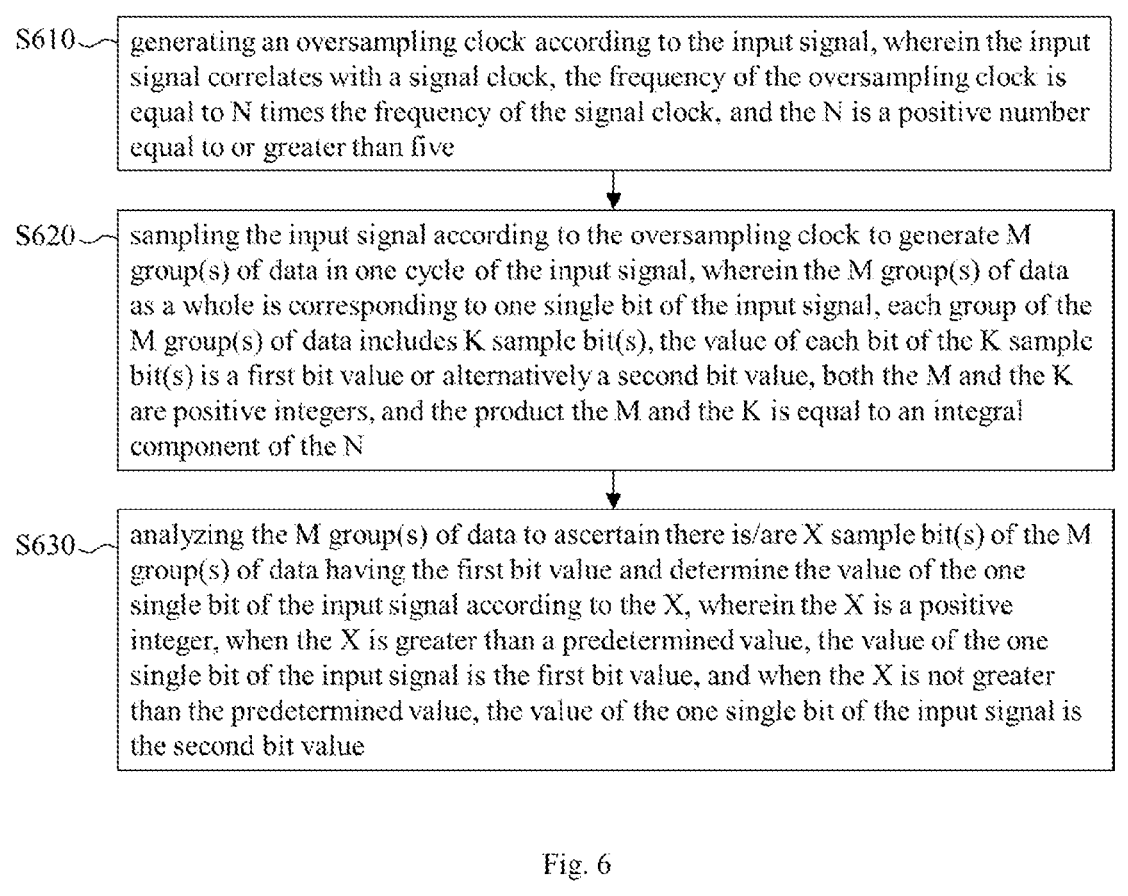

S610 ⌐ generating an oversampling clock according to the input signal, wherein the input signal correlates with a signal clock, the frequency of the oversampling clock is equal to N times the frequency of the signal clock, and the N is a positive number equal to or greater than five S620 ⌐ sampling the input signal according to the oversampling clock to generate M group(s) of data in one cycle of the input signal, wherein the M group(s) of data as a whole is corresponding to one single bit of the input signal, each group of the M group(s) of data includes K sample bit(s), the value of each bit of the K sample bit(s) is a first bit value or alternatively a second bit value, both the M and the K are positive integers, and the product the M and the K is equal to an integral component of the N S630 ⌐ analyzing the M group(s) of data to ascertain there is/are X sample bit(s) of the M group(s) of data having the first bit value and determine the value of the one single bit of the input signal according to the X, wherein the X is a positive integer, when the X is greater than a predetermined value, the value of the one single bit of the input signal is the first bit value, and when the X is not greater than the predetermined value, the value of the one single bit of the input signal is the second bit value

Fig. 6

FALLING-EDGE MODULATION SIGNAL RECEIVER AND FALLING-EDGE MODULATION SIGNAL SAMPLING METHOD

BACKGROUND OF THE INVENTION

1. Field of the Invention

The present disclosure relates to a signal receiver and a signal sampling method, especially to a falling-edge modulation signal receiver and a falling-edge modulation signal sampling method.

2. Description of Related Art

An HDMI enhanced Audio Return Channel (eARC) is implemented with a positive-end signal transmission line (eARC+) and a negative-end signal transmission line (eARC−), and can function as a Differential Mode Audio Channel (DMAC) for the transmission of audio signals and function as a Common Mode Data Channel (CMDC) for bilateral communication. The DMAC transmits an audio clock and an audio stream in the form of a differential signal. The CMDC exchanges control information in the form of a common-mode signal. In addition, an eARC audio transmitting end (hereinafter referred to as the eARC-TX) uses a biphase-mark signal (BMC) of falling-edge modulation (hereinafter referred to as the falling-edge modulation signal) to transmit audio information with eARC+ and eARC−. In consideration of that the bit "1" of the falling-edge modulation signal has a duty cycle "60%" and the bit "0" of the falling-edge modulation signal has a duty cycle "40%", an eARC audio receiving end (hereinafter referred to as the eARC-RX) samples the falling-edge modulation signal at the middle of each cycle of the falling-edge modulation signal and thereby determines the value of each bit of the falling-edge modulation signal as shown in FIGS. 1a~1b. In FIGS. 1a~1b, TO denotes the start point of one cycle of the falling-edge modulation signal, Tl denotes the end point of the cycle, and TS denotes the sampling point. However, the configuration of the HDMI eARC is a PN mismatch configuration and a DC-bias voltage difference exists between the positive-end DC bias voltage and the negative-end DC bias voltage that are established by the common-mode signal transmitting end (i.e., eARC-TX or eARC-RX), and this may cause the duty cycle of the falling-edge modulation signal to shift to left or right in the timeline and result in an erroneous sample result generated by the eARC-RX.

The background knowledge of the HDMI eARC is found in the HDMI 2.1 Specification.

SUMMARY OF THE INVENTION

An object of the present disclosure is to provide a falling-edge modulation signal receiver and a falling-edge modulation signal sampling method that can prevent the problems in the prior art.

An embodiment of the falling-edge modulation signal receiver of the present disclosure is used for processing an input signal having a current duty cycle which varies with a current bit value of the input signal based on falling-edge modulation. This embodiment includes a phase-locked loop, an oversampling circuit, and a decision circuit. The phase-locked loop is configured to generate an oversampling clock according to the input signal, wherein the input signal correlates with a signal clock, the oversampling frequency is equal to N times the frequency of the signal clock, and the N is a positive number equal to or greater than five. The oversampling circuit is configured to receive the oversampling clock and the input signal and then sample the input signal according to the oversampling clock so as to generate M group(s) of data in one cycle of the input signal, wherein the M group(s) of data as a whole is corresponding to one single bit of the input signal, each group of the M group(s) of data includes K sample bit(s), the value of each of the K sample bit(s) is a first bit value or alternatively a second bit value, both the M and the K are positive integers, and the product the M and the K is equal to an integral component of the N. The decision circuit is configured to analyze the M group(s) of data and thereby ascertain there is/are X sample bit(s) of the M group(s) of data having the first bit value and determine the value of the one single bit of the input signal according to the X, wherein the X is a positive integer. When the decision circuit finds that the X satisfies a condition, the decision circuit determines that the value of the one single bit of the input signal is the first bit value; and when the decision circuit finds that the X does not satisfy the condition, the decision circuit determines that the value of the one single bit of the input signal is the second bit value.

An embodiment of the falling-edge modulation signal sampling method of the present disclosure is used for sampling an input signal having a current duty cycle which varies with a current bit value of the input signal based on falling-edge modulation. This embodiment includes the following steps: generating an oversampling clock according to the input signal, wherein the input signal correlates with a signal clock, the oversampling frequency is equal to N times the frequency of the signal clock, and the N is a positive number equal to or greater than five; sampling the input signal according to the oversampling clock to generate M group(s) of data in one cycle of the input signal, wherein the M group(s) of data as a whole is corresponding to one single bit of the input signal, each group of the M group(s) of data includes K sample bit(s), the value of each of the K sample bit(s) is a first bit value or alternatively a second bit value, both the M and the K are positive integers, and the product the M and the K is equal to an integral component of the N; and analyzing the M group(s) of data to ascertain there is/are X sample bit(s) of the M group(s) of data having the first bit value and determine the value of the one single bit of the input signal according to the X, wherein the X is a positive integer, when the X is greater than a predetermined value, the value of the one single bit of the input signal is the first bit value, and when the X is not greater than the predetermined value, the value of the one single bit of the input signal is the second bit value.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 6 shows an embodiment of the falling-edge modulation signal sampling method of the present disclosure.

DETAILED DESCRIPTION OF THE PREFERRED EMBODIMENTS

The present specification discloses a falling-edge modulation signal receiver and a falling-edge modulation signal sampling method. The signal receiver and the signal sampling method can correctly determine the bit values of an input signal under a PN mismatch configuration. An example of the input signal is a signal (e.g., a single-ended signal) generated according to an HDMI enhanced Audio Return Channel (eARC) differential signal, but the implementation of the present invention is not limited thereto.

Figure 1A:
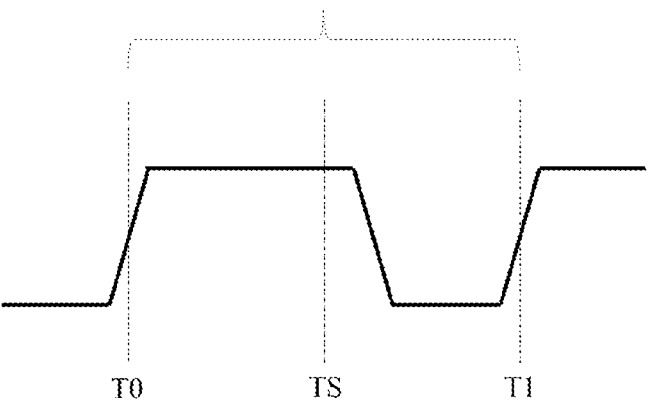
FIG. 1a shows the sampling point for sampling the bit "1" of a falling-edge modulation signal based on the prior art.
Figure 1B:
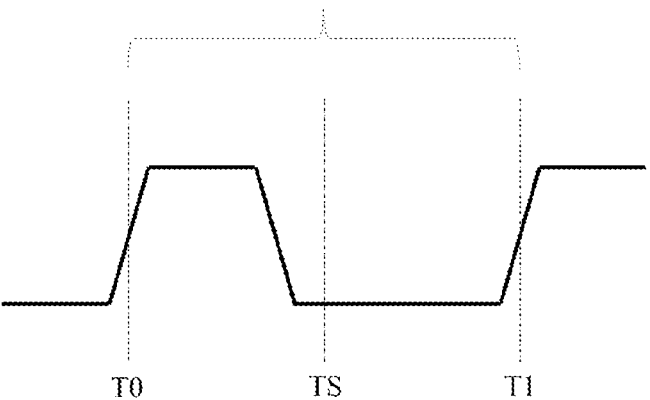
FIG. 1b shows the sampling point for sampling the bit "0" of a falling-edge modulation signal based on the prior art.
Figure 2:
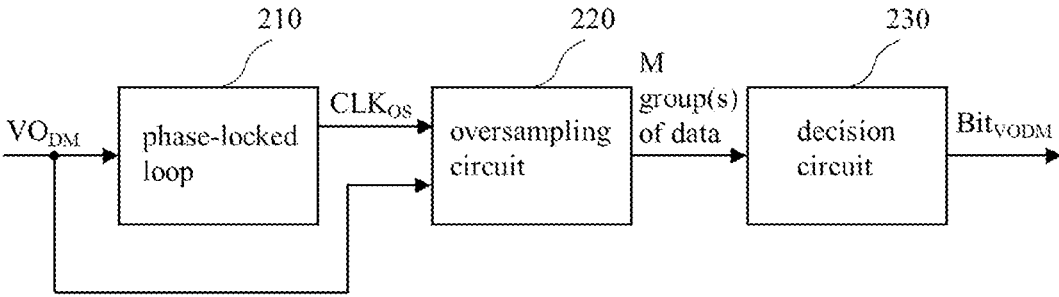
FIG. 2 shows an embodiment of the falling-edge modulation signal receiver of the present disclosure.

FIG. 2 shows an embodiment of the falling-edge modulation signal receiver of the present disclosure. The falling-edge modulation signal receiver 200 of FIG. 2 is configured to process an input signal $VO_{DM}$. Based on falling-edge modulation, the input signal $VO_{DM}$ has a current duty cycle varying with a current bit value of a current bit of the input signal $VO_{DM}$. For example, when the bit value of any bit of the input signal $VO_{DM}$ is "1", the duty cycle of this bit is 60%; and when the bit value of any bit of the input signal $VO_{DM}$ is "0", the duty cycle of this bit is 40%. The falling-edge modulation signal receiver 200 includes a phase-locked loop 210, an oversampling circuit 220, and a decision circuit 230. These circuits are described in detail in the following paragraphs.

Referring to FIG. 2, the phase-locked loop 210 is configured to generate an oversampling clock $CLK_{OS}$ according to the input signal $VO_{DM}$, wherein the input signal $VO_{DM}$ correlates with a signal clock CLK, the oversampling frequency of $CLK_{OS}$ is equal to N times the frequency of the signal clock CLK, and the N is a positive number equal to or greater than five (e.g., an integer equal to or greater than forty). The N is at least five to prevent the resolution with respect to the sample data (i.e., the M group(s) of data mentioned in the following paragraphs) from being lower than the minimum resolution (e.g., 20%) with respect to the falling-edge modulation, and thereby ensure that the value of each bit of the sample data is determined reliably. A larger N can allow the falling-edge modulation signal receiver 200 to tolerate a higher bit-error rate. The phase-locked loop 210 is realized with a known/self-developed phase-locked loop technology.

Referring to FIG. 2, the oversampling circuit 220 is configured to receive the oversampling clock $CLK_{OS}$ and the input signal $VO_{DM}$ and then sample the input signal $VO_{DM}$ according to the oversampling clock $CLK_{OS}$ so as to generate M group(s) of data in one cycle of the input signal $VO_{DM}$. The M group(s) of data as a whole represents one single bit $Bit_{VODM}$ of the input signal $VO_{DM}$; each group of the M group(s) of data includes K sample bit(s); the value of each bit of the K sample bit(s) is a first bit value or alternatively a second bit value; when the first bit value is "1", the second bit value is "0", and when the first bit value is "0", the second bit value is "1"; and the M is a positive integer (e.g., M≥4), the K is a positive integer (e.g., K≥10), and the product the M and the K is equal to the integral component of the N. For example; the N, the M, and the K are 40, 4, and 10 respectively, which means that the oversampling circuit 220 samples the input signal $VO_{DM}$ according to the oversampling clock $CLK_{OS}$ having the frequency 40 times the frequency of the signal clock CLK and thereby generates 4 groups of data, wherein each group of data includes 10 bits; the bit value "1" of the input signal $VO_{DM}$ is corresponding to the duty cycle "60%", the bit value "0" of the input signal $VO_{DM}$ is corresponding to the duty cycle "40%", and thus when the bit value of the one single bit $Bit_{VODM}$ is "1", ideally the 4 groups of data are supposed to be "1111111111", "1111111111", "1111000000", and "0000000000" which as a whole includes N×60%=40× 60%=24 sample bits "1" and N×40%=40×40%=16 sample bits "0"; and when the bit value of the one single bit $Bit_{VODM}$ is "0", ideally the 4 groups of data are supposed to be "1111111111", "1111110000", "0000000000", and "0000000000" which as a whole includes 40×40%=16 sample bits "1" and 40×60%=24 sample bits "0".

Referring to FIG. 2, the decision circuit 230 is configured to analyze the M group(s) of data (i.e., the M×K=N sample bits) and thereby ascertain there is/are X sample bit(s) of the M group(s) of data having the first bit value and determine the value of the one single bit $Bit_{VODM}$ of input signal $VO_{DM}$ according to the X, wherein the X is a positive integer. To be more specific, when the decision circuit 230 finds that the X satisfies a condition, the decision circuit 230 determines that the value of the one single bit $Bit_{VODM}$ is the first bit value, and when the decision circuit 230 finds that the X does not satisfy the condition, the decision circuit 230 determines that the value of the one single bit $Bit_{VODM}$ is the second bit value. It is noted that since the value of the one single bit $Bit_{VODM}$ of the input signal $VO_{DM}$ is dependent on the duty cycle of the input signal $VO_{DM}$ (e.g., the duty cycle "60%" corresponding to the bit value "1" and the duty cycle "40%" corresponding to the bit value "0") and is represented by the N sample bits, the X reflects the value of the one single bit $Bit_{VODM}$ of the input signal $VO_{DM}$.

For example, provided the first bit value is "1", the second bit value is "0", the bit value "1" of any bit of the input signal $VO_{DM}$ is corresponding to the duty cycle 60%, and the bit value "0" of any bit of the input signal $VO_{DM}$ is corresponding to the duty cycle 40%, in a perfect condition: when the bit value of a bit of the input signal $VO_{DM}$ is "1", the X (i.e., the total number of the sample bits "1") is equal to N×60% (e.g., 40×60%=24); and when the bit value of a bit of the input signal $VO_{DM}$ is "0", the X is equal to N×40% (e.g., 40×40%=16). Based on the above features, the decision circuit 230 can determine whether the X is greater than a predetermined value (e.g., N×50%) and thereby determine whether the X satisfies the aforementioned condition. When the X is greater than the predetermined value (i.e., when the total number of the sample bits "1" is more than a half of all the N sample bits), the decision circuit 230 determines the X does not satisfy the condition and thereby ascertains the value of the one single bit $Bit_{VODM}$ of the input signal $VO_{DM}$ is "1". When the X is not greater than the predetermined value (i.e., when the total number of the sample bits "1" is less than a half of all the N sample bits), the decision circuit 230 determines the X does not satisfy the condition and thereby ascertains the value of the one single bit $Bit_{VODM}$ of the input signal $VO_{DM}$ is "0".

For example, provided the first bit value is "0", the second bit value is "1", the bit value "0" of any bit of the input signal $VO_{DM}$ is corresponding to the duty cycle 40%, and the bit value "1" of any bit of the input signal $VO_{DM}$ is corresponding to the duty cycle 60%, in a perfect condition: when the bit value of a bit of the input signal $VO_{DM}$ is "0", the X (i.e., the total number of the sample bits "0") is equal to N×60% (e.g., 40×60%=24); and when the bit value of a bit of the input signal $VO_{DM}$ is "1", the X is equal to N×40% (e.g., 40×40%=16). Based on the above features, the decision circuit 230 can determine whether the X is greater than a predetermined value (e.g., N×50%) and thereby determine whether the X satisfies the aforementioned condition. When the X is greater than the predetermined value (i.e., when the total number of the sample bits "0" is more than a half of all the N sample bits), the decision circuit 230 determines the X satisfies the condition and thereby ascertains the value of the one single bit $Bit_{VODM}$ of the input signal $VO_{DM}$ is "0". When the X is not greater than the predetermined value (i.e., when the total number of the sample bits "0" is less than a half of all the N sample bits), the decision circuit 230 determines the X does not satisfy the condition and thereby ascertains the value of the one single bit $Bit_{VODM}$ of the input signal $VO_{DM}$ is "1"

It is noted that the predetermined value is determined according to the difference between the high duty cycle (e.g., 60%) and the low duty cycle (e.g., 40%) of the falling-edge modulation, and can be determined according to implementation needs (e.g., N×45%≤the predetermined value≤N×55%).

Ideally, the M group(s) of data (i.e., M×K=N bits) in each cycle of the input signal $VO_{DM}$ is/are composed of consecutive sample bits "1" and consecutive sample bits "0". For example, when the M group(s) of data as a whole denotes the bit "1" (or alternatively the bit "0") of the input signal $VO_{DM}$, the N sample bits are composed of consecutive N×60% sample bits "1" (or alternatively N×40% sample bits "1") and N×40% sample bits "0" (or alternatively N×60% sample bits "0"). However, in some circumstances one or more abnormal sample bit(s) "0" (or alternatively "1") exist(s) between consecutive sample bits "1" (or alternatively "0") (e.g., "11111101111011111111" or "00000110000000000000"), and the abnormal sample bit(s) are erroneous and called bubble(s). In the above circumstances, the decision circuit 230 can remove the bubble(s) first and then determine the X, or the decision circuit 230 can use known/self-developed technologies (e.g., a known tree adder) to determine the X without removing the bubble(s).

Figure 3:
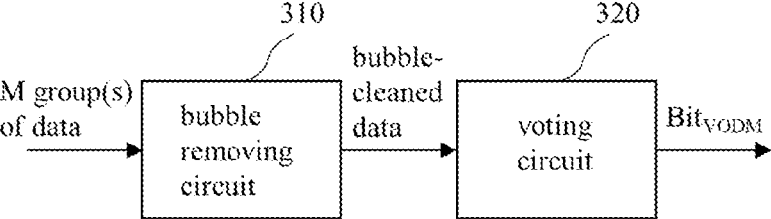
FIG. 3 shows an embodiment of the decision circuit of FIG. 2.

FIG. 3 shows an embodiment of the decision circuit 230 of FIG. 2. Referring to FIG. 3, the decision circuit 230 includes a bubble removing circuit 310 and a voting circuit 320 (e.g., a majority voting circuit). The bubble removing circuit 310 is configured to determine whether any group of the M group(s) of data is erroneous (i.e., to determine whether any group of the M group(s) of data has bubbles), and when any group of the M group(s) of data is erroneous, the bubble removing circuit 310 replaces this erroneous group of data with a group of bubble-cleaned data which is then outputted to the voting circuit 320. The voting circuit 320 is configured to determine the X according to the variation in the sample bits of the examined M group(s) of data without bubbles, and then determine whether the X satisfies the condition to ascertain the value of the one single bit $Bit_{VODM}$ and output it. For example, the voting circuit 320 can determine whether the X satisfies the condition (e.g., to determine whether the X is greater than N/2) according to the N and the X.

Figure 4:
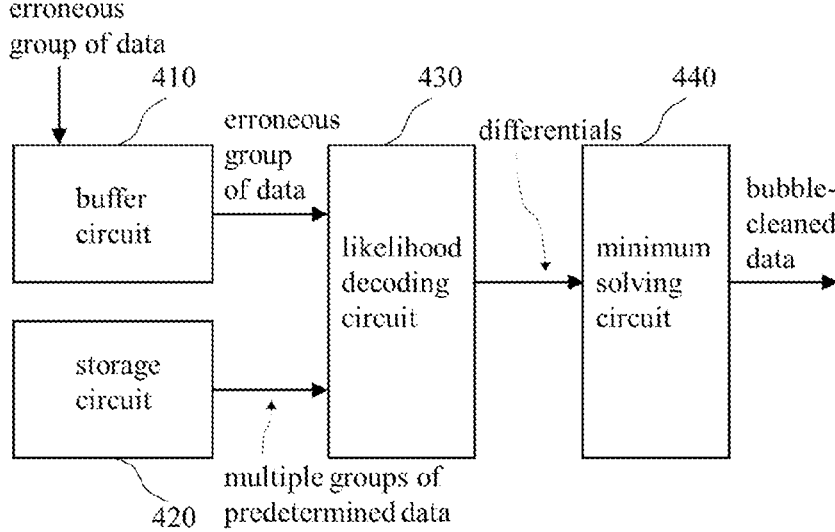
FIG. 4 shows an embodiment of the bubble removing circuit of FIG. 3.

FIG. 4 shows an embodiment of the bubble removing circuit 310 of FIG. 3. Referring to FIG. 4, the bubble removing circuit 310 includes a buffer circuit 410, a storage circuit 420, a likelihood decoding circuit 430, and a minimum solving circuit 440. The buffer circuit 410 is configured to temporarily store the erroneous group of data. The storage circuit 420 is configured to store multiple groups of predetermined data. The likelihood decoding circuit 430 is configured to compare each group of the multiple groups of predetermined data with the erroneous group of data and thereby generate multiple differentials, wherein each differential is corresponding to one comparison result. For example, the likelihood decoding circuit 430 includes a plurality of circuits (not shown in figures), each of which includes an XOR gate and a Hamming distance calculating circuit, wherein the XOR gate receives the erroneous group of data and one group of the multiple groups of data to generate an XOR result, and the Hamming distance calculating circuit receives the XOR result and accordingly generates a Hamming distance (e.g., the total number of the sample bits "1" in the XOR result) as one of the multiple differentials. The minimum solving circuit 440 is configured to determine the minimum differential of the multiple differentials in a known/self-developed sorting manner or other known/self-developed manners. The minimum solving circuit 440 is further configured to use a look-up table or other known/self-developed technologies to replace the erroneous group of data with the group of bubble-cleaned data according to the minimum differential; for example, the look-up table stores multiple groups of data without bubbles, and the minimum solving circuit 440 chooses one of the multiple groups of data according to the minimum differential as the group of bubble-cleaned data. It is noted that the bubble removing circuit 310 can process each group of the M group(s) of data to ensure the M group(s) of data has/have no bubbles. It is also noted that the bubble removing circuit 310 can operate according to the oversampling clock $CLK_{OS}$ or any appropriate operation clock.

Figure 5:
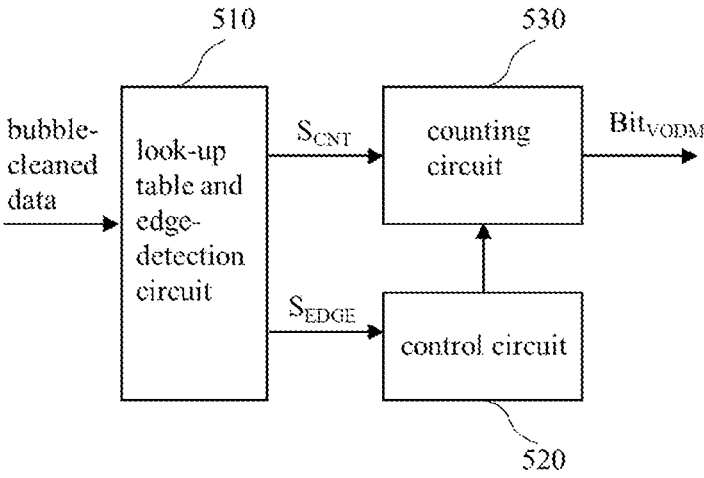
FIG. 5 shows an embodiment of the voting circuit of FIG. 3.

FIG. 5 shows an embodiment of the voting circuit 320. Referring to FIG. 5, the voting circuit 320 includes a look-up-table and edge-detection circuit 510, a control circuit 520, and a counting circuit 530. The look-up-table and edge-detection circuit 510 is configured to perform a look-up operation according to a group of bubble-cleaned data (i.e., a group of the examined M group(s) of data without bubbles) to find out how many sample bits "1" are included in the group of bubble-cleaned data. The look-up-table and edge-detection circuit 510 is further configured to perform a logical operation according to the pattern of the group of bubble-cleaned data and the pattern of a previous group of bubble-cleaned data to determine whether the group of bubble-cleaned data includes a boundary of the input signal $VO_{DM}$. In addition, the look-up-table and edge-detection circuit 510 is configured to generate at least one count value $S_{CNT}$ according to the result of the look-up operation and the result of the logical operation, and to generate an edge-detection signal SEDGE according to the result of the logical operation. The control circuit 520 is configured to learn whether the group of bubble-cleaned data includes a boundary according to the edge-detection signal SEDGE and thereby output a control signal $S_{CTRL}$ for controlling an operation mode of the counting circuit 530. The counting circuit 530 is configured to operate in a boundary mode or alternatively a non-boundary mode according to the control signal $S_{CTRL}$, and thereby generate the value of the one single bit $Bit_{VODM}$ of the input signal $VO_{DM}$ according to the at least one count value $S_{CNT}$. It is noted that other known/self-developed circuits (e.g., tree adders) can be used to determine how many sample bits "1" are included in the group of bubble-cleaned data; however, since no bubbles are contained in the group of bubble-cleaned data, the possible patterns of the group of bubble-cleaned data are quietly limited (e.g., when the number of sample bits of the group of bubble-cleaned data is K, the total number of the possible patterns is reduced to 2K from $2^K$) and thus the look-up-table and edge-detection circuit 510 could be more efficient and a better choice.

Referring to FIG. 5, in an exemplary implementation a group of bubble-cleaned data includes 10 bits:

(1) providing the first group of data is "0001111111": the look-up-table and edge-detection circuit 510 learns that the group of bubble-cleaned data has 7 sample bits "1" through the aforementioned look-up operation, and thereby outputs a high-level-bit count "7" and a cycle count "7" to the counting circuit 530; and furthermore the look-up-table and edge-detection circuit 510 learns that the group of bubble-cleaned data includes a rising boundary (i.e., the boundary of a cycle of the input signal $VO_{DM}$) from the sample bit "0" to the sample bit "1" through the aforementioned logical operation and then informs the control circuit 520 (e.g., a finite-state machine) of this detection result so that the control circuit 520 requests the counting circuit 530 to operate in the aforementioned boundary mode. Accordingly, the counting circuit 530 balances the counts for the current cycle, and then restarts the counting operation for a new cycle so as to accumulate the number of sample bits "1" from zero to update the high-level-bit count (i.e., 0+7=7) and reckon by time from zero to update the cycle count (i.e., 0+7=7).

(2) providing the second group of data is "1111111111": the look-up-table and edge-detection circuit 510 learns that the group of bubble-cleaned data has 10 sample bits "1" through the look-up operation, and thereby outputs a high-level-bit count "10" and a cycle count "10" to the counting circuit 530; and furthermore the look-up-table and edge-detection circuit 510 learns that the group of bubble-cleaned data does not include any rising boundary through the logical operation and then informs the control circuit 520 of this detection result so that the control circuit 520 requests the counting circuit 530 to operate in the aforementioned non-boundary mode. Accordingly, the counting circuit 530 continues the counting operation for the current cycle so as to accumulate the number of sample bits "1" from the latest cumulative high-level-count "7" to update the high-level-bit count (i.e., 7+10=17) and reckon by time from the latest cumulative cycle count "7" to update the cycle count (i.e., 7+10=17).

(3) providing the third group of data is "1111110000": the look-up-table and edge-detection circuit 510 learns that the group of bubble-cleaned data has 6 sample bits "1" through the look-up operation, and thereby outputs a high-level-bit count "6" and a cycle count "10" to the counting circuit 530; and furthermore the look-up-table and edge-detection circuit 510 learns that the group of bubble-cleaned data does not include any rising boundary but includes a falling edge from the sample bit "1" to the sample bit "0" through the logical operation and then informs the control circuit 520 of this detection result so that the control circuit 520 requests the counting circuit 530 to operate in the non-boundary mode. Accordingly, the counting circuit 530 continues the counting operation for the current cycle so as to accumulate the number of sample bits "1" from the latest cumulative high-level-count "17" to update the high-level-bit count (i.e., 17+6=23) and reckon by time from the latest cumulative cycle count "17" to update the cycle count (i.e., 17+10=27). In addition, the counting circuit stops accumulating the number of sample bits "1" since the falling edge till the next rising boundary (i.e., the boundary of a cycle of the input signal $VO_{DM}$).

(4) providing the fourth group of data is "0000000000": the look-up-table and edge-detection circuit 510 learns that the group of bubble-cleaned data has 0 sample bits "1" through the look-up operation, and thereby outputs a high-level-bit count "0" and a cycle count "10" to the counting circuit 530; and furthermore the look-up-table and edge-detection circuit 510 learns that the group of bubble-cleaned data does not include any rising boundary through the logical operation and then informs the control circuit 520 of this detection result so that the control circuit 520 requests the counting circuit 530 to operate in the non-boundary mode. Accordingly, the counting circuit 530 continues the counting operation for the current cycle so as to reckon by time from the latest cumulative cycle count "27" to update the cycle count (i.e., 27+10=37).

(5) providing the fifth group of data is "0000011111": the look-up-table and edge-detection circuit 510 learns that the group of bubble-cleaned data has 5 sample bits "1" (belonging to the next cycle) through the look-up operation, and thereby outputs a high-level-bit count "5" and a cycle count "5" (belonging to the next cycle) to the counting circuit 530; and furthermore the look-up-table and edge-detection circuit 510 learns that the group of bubble-cleaned data includes a rising boundary (i.e., the boundary of a cycle of the input signal $VO_{DM}$) from the sample bit "0" to the sample bit "1" through the logical operation and then informs the control circuit 520 of this detection result so that the control circuit 520 requests the counting circuit 530 to operate in the boundary mode. Accordingly, the counting circuit 530 balances the counts for the current cycle to obtain the cycle count "42" (i.e., 37+(10–5)=42) and then determines that the high-level-bit count "23" is greater than the aforementioned predetermined value $$\left(e.g.,\ fifty\ percent\ of\ the\ cycle\ count = \frac{42}{2} = 21\right),$$

and afterwards the counting circuit 530 outputs the value "1" as the value of a single bit of the input signal $VO_{DM}$ corresponding to the current cycle and then restarts the counting operation for the next cycle.

FIG. 6 shows an embodiment of the falling-edge modulation signal sampling method of the present disclosure which is executed by the falling-edge modulation signal receiver 200 of FIG. 2 or the equivalent thereof. This embodiment is used for sampling an input signal having a current duty cycle which varies with a current bit value of the input signal based on falling-edge modulation. The embodiment of FIG. 6 includes the following steps:

S610: generating an oversampling clock according to the input signal, wherein the input signal correlates with a signal clock, the oversampling frequency is equal to N times the frequency of the signal clock, and the N is a positive number equal to or greater than five;

S620: sampling the input signal according to the oversampling clock to generate M group(s) of data in one cycle of the input signal, wherein the M group(s) of data as a whole is corresponding to one single bit of the input signal, each group of the M group(s) of data includes K sample bit(s), the value of each bit of the K sample bit(s) is a first bit value or alternatively a second bit value, both the M and the K are positive integers, and the product the M and the K is equal to an integral component of the N; and S630: analyzing the M group(s) of data to ascertain there is/are X sample bit(s) of the M group(s) of data having the first bit value and determine the value of the one single bit of the input signal according to the X, wherein the X is a positive integer, when the X is greater than a predetermined value, the value of the one single bit of the input signal is the first bit value, and when the X is not greater than the predetermined value, the value of the one single bit of the input signal is the second bit value.

Since those having ordinary skill in the art can refer to the embodiments of FIGS. 2~5 to appreciate the detail and the modification of the embodiment of FIG. 6, repeated and redundant description is omitted here.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention is flexible based on the present disclosure.

To sum up, the falling-edge modulation signal receiver and the falling-edge modulation signal sampling method of the present disclosure can correctly determine the bit values of an input signal under a PN mismatch configuration. In other words, the falling-edge modulation signal receiver and the falling-edge modulation signal sampling method of the present disclosure can highly tolerate the influence of the PN mismatch configuration.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A falling-edge modulation signal receiver configured to process an input signal having a current duty cycle which varies with a current bit value of the input signal based on falling-edge modulation, the falling-edge modulation signal receiver including:

a phase-locked loop configured to generate an oversampling clock according to the input signal, wherein the input signal correlates with a signal clock, an oversampling frequency is equal to N times a frequency of the signal clock, and the N is a positive number equal to or greater than five;

an oversampling circuit configured to receive the oversampling clock and the input signal and then sample the input signal according to the oversampling clock so as to generate M group(s) of data in one cycle of the input signal, wherein the M group(s) of data as a whole is corresponding to one single bit of the input signal, each group of the M group(s) of data includes K sample bit(s), a value of each of the K sample bit(s) is a first bit value or alternatively a second bit value, both the M and the K are positive integers, and a product the M and the K is equal to an integral component of the N; and a decision circuit configured to analyze the M group(s) of data and thereby ascertain there is/are X sample bit(s) of the M group(s) of data having the first bit value and determine a value of the one single bit of the input signal according to the X, wherein the X is a positive integer, when the decision circuit finds that the X satisfies a condition, the decision circuit determines that the value of the one single bit of the input signal is the first bit value, and when the decision circuit finds that the X does not satisfy the condition, the decision circuit determines that the value of the one single bit of the input signal is the second bit value, wherein the N is equal to or greater than forty, the M is equal to or greater than four, and the K is equal to or greater than ten.

2. The falling-edge modulation signal receiver of claim 1, wherein the input signal originates from an HDMI enhanced Audio Return Channel (eARC) differential signal.

3. The falling-edge modulation signal receiver of claim 1, wherein the first bit value is one and the second bit value is zero; when the X is greater than a predetermined value, the decision circuit determines that the X satisfies the condition; and when the X is not greater than the predetermined value, the decision circuit determines that the X does not satisfy the condition.

4. The falling-edge modulation signal receiver of claim 1, wherein the first bit value is zero and the second bit value is one; when the X is greater than a predetermined value, the decision circuit determines that the X satisfies the condition; and when the X is not greater than the predetermined value, the decision circuit determines that the X does not satisfy the condition.

5. A falling-edge modulation signal receiver configured to process an input signal having a current duty cycle which varies with a current bit value of the input signal based on falling-edge modulation, the falling-edge modulation signal receiver including:

a phase-locked loop configured to generate an oversampling clock according to the input signal, wherein the input signal correlates with a signal clock, an oversampling frequency is equal to N times a frequency of the signal clock, and the N is a positive number equal to or greater than five;

an oversampling circuit configured to receive the oversampling clock and the input signal and then sample the input signal according to the oversampling clock so as to generate M group(s) of data in one cycle of the input signal, wherein the M group(s) of data as a whole is corresponding to one single bit of the input signal, each group of the M group(s) of data includes K sample bit(s), a value of each of the K sample bit(s) is a first bit value or alternatively a second bit value, both the M and the K are positive integers, and a product the M and the K is equal to an integral component of the N; and a decision circuit configured to analyze the M group(s) of data and thereby ascertain there is/are X sample bit(s) of the M group(s) of data having the first bit value and determine a value of the one single bit of the input signal according to the X, wherein the X is a positive integer, when the decision circuit finds that the X satisfies a condition, the decision circuit determines that the value of the one single bit of the input signal is the first bit value, and when the decision circuit finds that the X does not satisfy the condition, the decision circuit determines that the value of the one single bit of the input signal is the second bit value, wherein the decision circuit includes a tree adder configured to derive the X from the M group(s) of data.

6. A falling-edge modulation signal receiver configured to process an input signal having a current duty cycle which varies with a current bit value of the input signal based on falling-edge modulation, the falling-edge modulation signal receiver including:

a phase-locked loop configured to generate an oversampling clock according to the input signal, wherein the input signal correlates with a signal clock, an oversampling frequency is equal to N times a frequency of the signal clock, and the N is a positive number equal to or greater than five;

an oversampling circuit configured to receive the oversampling clock and the input signal and then sample the input signal according to the oversampling clock so as to generate M group(s) of data in one cycle of the input signal, wherein the M group(s) of data as a whole is corresponding to one single bit of the input signal, each group of the M group(s) of data includes K sample bit(s), a value of each of the K sample bit(s) is a first bit value or alternatively a second bit value, both the M and the K are positive integers, and a product the M and the K is equal to an integral component of the N; and a decision circuit configured to analyze the M group(s) of data and thereby ascertain there is/are X sample bit(s) of the M group(s) of data having the first bit value and determine a value of the one single bit of the input signal according to the X, wherein the X is a positive integer, when the decision circuit finds that the X satisfies a condition, the decision circuit determines that the value of the one single bit of the input signal is the first bit value, and when the decision circuit finds that the X does not satisfy the condition, the decision circuit determines that the value of the one single bit of the input signal is the second bit value, wherein the decision circuit includes:

a bubble removing circuit configured to determine whether any group of the M group(s) of data is erroneous, wherein when a certain group of the M group(s) of data is found erroneous, the bubble removing circuit replaces the certain group of the M group(s) of data with a group of bubble-cleaned data.

7. The falling-edge modulation signal receiver of claim 6, wherein the bubble removing circuit compares each group of multiple groups of predetermined data with the certain group of the M group(s) of data and thereby generates multiple differentials; and the bubble removing circuit searches pre-stored data according to a minimum differential of the multiple differentials to obtain the group of bubble-cleaned data corresponding to the minimum differential.

8. The falling-edge modulation signal receiver of claim 7, wherein the bubble removing circuit includes:

a buffer circuit configured to temporarily store the certain group of the M group(s) of data;

a storage circuit configured to store the multiple groups of predetermined data;

a likelihood decoding circuit configured to compare the each group of the multiple groups of predetermined data with the certain group of the M group(s) of data and thereby generates the multiple differentials; and a minimum solving circuit configured to determine the minimum differential of the multiple differentials and thereby output the group of bubble-cleaned data.

9. The falling-edge modulation signal receiver of claim 6, wherein the decision circuit further includes a voting circuit configured to obtain the X according to variations in bit values of the M group(s) of data and then determine whether the X satisfies the condition.

10. The falling-edge modulation signal receiver of claim 9, wherein the voting circuit includes:

a look-up-table and edge-detection circuit configured to generate at least one count value and an edge-detection signal according to the group of bubble-cleaned data;

a control circuit configured to generate a control signal according to the edge-detection signal; and a counting circuit configured to operate in a boundary mode or alternatively a non-boundary mode according to the control signal, and thereby generate the value of the one single bit of the input signal according to the at least one count value.

* * * * *